2,848,422

PREPARATION OF ACTIVE CONTACT MASSES FROM KAOLIN CLAYS

Joseph J. Donovan, Swarthmore, and Thomas H. Milliken, Jr., Moylan, Pa., assignors to Houdry Process Corporation, Wilmington, Del., a corporation of Delaware No Drawing. Application June 6, 1955
Serial No. 513,608

2 Claims. (Cl. 252—440)

The present invention relates to the preparation of hydrocarbon conversion catalysts from naturally occurring hydrosilicates of aluminum, such as earth and clays, and more particularly to the preparation of hydrocarbon cracking catalysts from kaolin clays.

Certain clays, such as the sub-bentonite clays of the montmorillonite series, have relatively poor adsorptivity and decolorizing activity in their raw state and are also substantially inert or impractical for use in this state as hydrocarbon conversion catalysts. By a familiar treatment with mineral acid, these clays become activated; and such acid activation of these clays has been widely employed to produce the well-known acid-activated clays of commerce, which are used as adsorptive decolorizing agents for oils and as catalysts in hydrocarbon conversion operations such as cracking.

There are many common and abundant clays, however, such as kaolins (including halloysite clays) which do not respond to the conventional methods of activation to produce catalysts having cracking activity at levels comparable with that of the aforementioned commercial acid activated subbentonite clays, nor do these clays possess after acid treatment comparable or desired decolorizing activity.

In accordance with the present invention natural hydrosilicates of aluminum including clays of the plastic kaolin type are activated by contact at an elevated temperature, such as a temperature of about 500 to 1200° F. with a gas which forms a strong acid in aqueous solution such as sulphur trioxide, followed by the removal of at least a portion of the deposited treating material preferably without reduction of the alumina content of the treated clay as by contact with a reducing gas.

The preferred embodiment of the present invention contemplates the use of sulphur trioxide as the treating agent. The preferred treatment temperature when sulphur trioxide is used constitutes a temperature of between about 650 and 900° F. It has been found that exceeding the temperature of 900° F. lowers the surface area of the treated material and adversely affects its catalytic properties.

Preferably, the sulphur trioxide is diluted with an inert carrier gas or diluent gas such as nitrogen or the like. A concentration of sulphur trioxide as low as 6 mole percent may be used, although higher mole percentages of sulphur trioxide in the treating gas will effect a more rapid rate of sulphation. Sulphur trioxide molar percentages appreciably higher than 30 mole percent in the treating gas offer little advantage, and in fact, sulphur trioxide gas concentrations in excess of 45 mole percent appear to yield lower surface areas for a given clay sulphation level than lower molar precentages and are thus not to be preferred.

While sulphur trioxide is the preferred treating agent, as heretofore noted, other gases which form acid aqueous solutions, such as hydrogen chloride, may be used. However, sulphur trioxide possesses the marked advantage that the removal of the sulphate ion from the treated clay may be effected without an appreciable decrease in the aluminum content of the treated clay catalyst. Thus, the sulphate ion content of the catalyst can be effectively removed as by heating the treated clay catalyst at a temperature of 1350° F. for a period of 4 hrs. with a reducing gas consisting of 90% steam and 10% hydrogen, without any appreciable loss of alumina from the treated clay. In contradistinction, treatment of a kaolin clay with hydrogen chloride forms aluminum chloride which is volatile at elevated temperatures. Accordingly, if hydrogen chloride is employed as the treating gas, there will be an appreciable reduction in the alumina content of the resultant catalyst.

The clay particles treated by sulphation in accordance with the present invention may be prepelleted or may comprise granulated kaolin clay particles. In the case of pelleted clay catalysts, granulated clay particles may be pelleted by being extruded in the form of cylinders or other shapes from a plasticized mixture of clay and water.

Inasmuch as it has been found that sulphation using treating gases comprising concentrations of sulphur trioxide greater than 45 mole percent produces a material having a surface area lower than that formed from lower sulphur trioxide concentrations when treated to a given clay sulphation level, and there does not seem to be any advantage or disadvantage in employing sulphur trioxide concentrations between 30 and 45 mole percent over lower sulphur trioxide concentrations, commercial sulfaters may be operated with sulfuric acid vapors obtained by boiling concentrated sulfuric acid. However, sulfation can be effected, although without equal success, with sulfur trioxide concentrations above 45 mole percent as up to 100 mole percent.

A preferred method of sulphation is to sulphate kaolin particles or pellets in a moving bed type of operation as wherein such particles or pellets are moving downwardly under the force of gravity. However, other methods of sulphation may be utilized, such as sulphating a fluidized or a fixed bed of particles.

The manner of carrying out the desulfation is important from the standpoint of the ultimate physical and catalytic properties of the ultimate finished catalyst pellets. Thus, it has been found that the presence of steam during the reduction or other decomposition of the sulfate in the clay results in the production of catalyst of reduced coking tendency; that is, the catalyst thus obtained shows comparatively better gasoline/coke ratios in hydrocarbon cracking under conventional operating conditions than similarly prepared kaolin catalysts in which steam is not employed. As a possible alternative the decomposition of the sulfate, particularly by reduction, might be carried out in the absence of steam, and the desulfated clay then subjected to steaming at a temperature above about 1000° F. to about 1550° F. or short of that which would cause initiation of sintering of the clay. This subsequent steaming step also tends to reduce the coking tendency of the catalyst but it is nevertheless preferred to employ steam during the decomposition of the sulfate, not only because of convenience of operation, but also because the repeated production of catalysts of lowest coking tendency is better assured.

In the preferred operation desulfation of the sulfated kaolin pellets is carried out at temperatures in the range of 1100–1600° F., better at 1350° F. or above, employing a reducing gas mixture composed of steam and hydrogen. At temperatures of 1300° F. and above the gas may contain as little as 1 mole percent hydrogen and be effective. At lower temperatures, higher concentrations of reducing agent in the gas mixture are required. Instead of or in addition to the hydrogen, carbon monoxide may be employed in about the same total ratio in the mixture of reducing gas to steam as hereinbefore described in the case of hydrogen alone. Carbon monoxide alone is less efficient than hydrogen at temperatures below 1200° F.

When hydrogen sulfide is used as the reducing gas, with or without the simultaneous presence of steam, lower temperatures are effective as from about 750° F. To assure the production of catalysts of low coking tendencies, however, with perhaps some gain in catalyst activity, the desulfated clay should be subjected to a subsequent steaming operation at temperatures above 1350° F. and preferably at 1500–1600° F.

When hydrogen sulfide is employed at temperatures of 1050° F. or higher, any iron present in combined form in the clay lattice may be freed and thereby activated. In such case it is best to remove the liberated iron, which can be readily accomplished by treatment with $NH_4Cl$ vapor.

In general whenever reduction is carried out in the absence of steam, the subsequent steaming should be carried out at above 1350° F. and preferably in the 1400–1600° F. temperature range using 100% steam or diluted with up to about 70–80% inert gas.

As indicated above, decomposition of the sulfate can be effected in a steam atmosphere without reducing agents if at sufficiently high temperature, but not necessarily with equal facility or effectiveness, as when using reducing agents.

In the reduction process of decomposing sulfate the initial reaction illustrated in Equation I below is endothermic; the second stage Reaction II is exothermic, (I)     $Al_2(SO_4)_3 \rightarrow Al_2O_3 + 3SO_3$ (II)    $3SO_3 + 3H_2 \rightarrow 3SO_2 + 3H_2O$ Hence, once the reaction illustrated in Equation I has been initiated, the reduction of the $SO_3$ supplies at least a part of the heat required to further the decomposition of the aluminum sulfate.

*Example 1*

The raw clay treated in this example was a kaolin clay from Putnam County, Florida, known as Edgar Plastic Kaolin which gave the following analysis on a dry (105° C.) sand-free basis:

|  | Percent |
|---|---|
| Ignition loss | 12.9 |
| $SiO_2$ | [1]46.6 |
| $Al_2O_3$ | [1]38.8 |
| $Fe_2O_3$ | 1.0 |
| CaO | 0.44 |
| MgO | 0.23 |
| $TiO_2$ | 0.35 |
| Alk. metal (as oxide) | 0.52 |

[1] $SiO_2/Al_2O_3 = 2/1$.

Pellets of the aforesaid clay which had been obtained by extruding a slurry mixture of clay and water containing added pulverized clay particles were sulfated by being contacted for a period of 23 hours at a temperature of 720 to 775° F. with a treating gas comprising 35.0 mole percent sulfur trioxide, 59.0 mole percent steam, and 6 mole percent air.

The resultant sulfated clay had a bulk density of 1.19–1.22 kilograms per liter, and a sulfur trioxide content (ignition basis) of 21.9 percent.

The aforesaid sulfated clay was reduced for four hours at 1350° F. with a 10 mole percent hydrogen and 90 mole percent steam mixture to yield a catalyst having a bulk density of 0.99 kilogram per liter, a 4-ball ball mill hardness index of 91, a jet attrition percent loss of 55, a knife edge hardness of more than 11,600 grams, and a surface area of 59 square meters per gram.

A fixed bed pilot plant run on 56–77% East Texas gas oil at 900° F. and at a space rate giving 50% (volume) conversion, produced the following results:

| | |
|---|---|
| $C_5 +$ gasoline (385° F. at 90%), vol. percent | 37 |
| Gas oil, vol. percent | 50 |
| $C_4$ cut, vol. percent | 13.1 |
| Dry gas wt. percent | 5.6 |
| Coke, wt. percent | 3.4 |
| Octane rating, $F_1$ clear | 92.8 |
| Space rate for 55 vol. percent conv. at 5 vol. cat./oil ratio (calc.) | 1.25 |

*Example 2*

Pellets similar to those used in Example 1 were charged to an externally wired quartz bomb treater and heated to 800° F. in dry air. Sulfur trioxide vapor obtained from boiling 80% sulfuric acid (about 30 mole percent sulfur trioxide) was passed through the pellets at the aforesaid temperature for a period of four hours followed by air purging with dry air.

The sulfated clay had on a dry clay basis an analysis of 36.2 weight percent sulfuric acid.

The sulfated pellets were then charged to a bomb and heated to 700° F. with dry nitrogen being passed therethrough, 10 mole percent hydrogen and 90 mole percent steam were then substituted for the nitrogen and passed through the pellets. The temperature was raised to 1350° F. and the hydrogen and steam treatment continued for four hours.

The resultant catalyst had a surface area of 79 square meters per gram, a bulk density of 0.98 kilograms per liter, a 4-ball ball mill hardness index of 96, a jet attrition percent loss of 27, and a knife edge hardness index of greater than 13,700 grams.

The hardness index (H. I.) of the catalyst was determined by a standard test designed as an empirical measure of frictional attrition. In this test the catalyst pellets of #3 to #5 screen size are rotated with steel balls in a cylindrical can on its longitudinal axis at constant speed for an hour. The hardness index (H. I.) is then computed by weighing the catalyst retained on a #6 screen, thus:

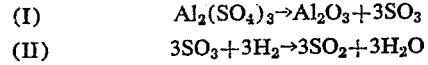

$$H.\ I. = \frac{Wt.\ \#6\ fraction \times 100}{Wt.\ of\ original\ (\#3\ to\ \#5)\ sample}$$

Knife-edge hardness is determined by loading a knife edge (of the type used in analytical balances), placed upon the cylindrical surface of the pellet, until the pellet breaks.

Jet attrition is determined by forcing a jet of air through a layer of the catalyst in an inverted Erlenmeyer flask for one hour to cause the pellets to strike the walls and bottom of the flask. The loss in weight of fines blown out by the jet is recorded as "jet attrition percent loss."

The present invention may be embodied in other specific forms without departing from the spirit or essential attributes thereof and, accordingly, reference should be made to the appended claims, rather than to the foregoing specification as indicating the scope of the invention.

It is claimed:

1. A method for sulphating kaolin clays which comprises contacting such clays at a temperature of about 650 to 900° F. with a gas containing from about 6 mol percent to about 45 mol percent sulphur trioxide, for a period at least sufficient to effect incorporation of about 22% $SO_3$ by weight in the clay.

2. A method for forming hydrocarbon conversion catalyst which comprises contacting a kaolin clay at a temperature of between about 650 to 900° F. with a gas containing from about 6 mol percent to about 45 mol percent sulfur trioxide for a period at least sufficient to effect incorporation of about 22% $SO_3$ by weight in the clay, and then desulfating the clay by contacting it with a reducing gas at elevated temperatures.

References Cited in the file of this patent

UNITED STATES PATENTS

| | | |
|---|---|---|
| 2,322,674 | Thomas | June 22, 1943 |
| 2,375,641 | Garrison | May 8, 1945 |
| 2,466,046 | Shabaker | Apr. 5, 1949 |
| 2,584,148 | Mills | Feb. 5, 1952 |